US009858032B2

(12) United States Patent
Kim

(10) Patent No.: US 9,858,032 B2
(45) Date of Patent: Jan. 2, 2018

(54) SCREEN SYNCHRONIZATION CONTROL SYSTEM, AND METHOD AND APPARATUS FOR SYNCHRONIZING A SCREEN USING SAME

(71) Applicant: ENTRIX CO., LTD., Seoul (KR)

(72) Inventor: Jonghyun Kim, Seoul (KR)

(73) Assignee: ENTRIX CO., LTD., Seoul (KR)

( * ) Notice: Subject to any disclaimer, the term of this patent is extended or adjusted under 35 U.S.C. 154(b) by 148 days.

(21) Appl. No.: 14/567,407

(22) Filed: Dec. 11, 2014

(65) Prior Publication Data
US 2015/0169278 A1   Jun. 18, 2015

Related U.S. Application Data

(63) Continuation of application No. PCT/KR2013/006817, filed on Jul. 30, 2013.

(30) Foreign Application Priority Data

Sep. 14, 2012 (KR) .................. 10-2012-0101969

(51) Int. Cl.
G06F 3/14       (2006.01)
H04L 12/12      (2006.01)
H04L 12/18      (2006.01)

(52) U.S. Cl.
CPC ............ G06F 3/1454 (2013.01); H04L 12/12 (2013.01); H04L 12/1827 (2013.01); Y02B 60/34 (2013.01)

(58) Field of Classification Search
CPC ............ G06F 17/30864; H04L 12/12; H04L 12/1827; H04L 65/1016; H04W 76/023;
(Continued)

(56) References Cited

U.S. PATENT DOCUMENTS 6,671,263 B1 * 12/2003 Potter .................... H04M 3/51
                                                            370/261
6,779,153 B1    8/2004 Kagle
(Continued)

FOREIGN PATENT DOCUMENTS

EP        1018689 A2       7/2000
KR   1020100110205 A      10/2010
WO     2007-026997 A1      3/2007

OTHER PUBLICATIONS

European Search Report for corresponding European Patent Application No. 13837470.7 dated Mar. 22, 2016.
(Continued)

Primary Examiner — Gerald Johnson
(74) Attorney, Agent, or Firm — Hauptman Ham, LLP

(57) ABSTRACT

The screen synchronization system includes: a service device establishing a control channel having at least one or more other terminals; transmitting source information for generating a web page to a service device; when the source information is received from a terminal, receiving the web page from the service device and displaying the web page on any one terminal; generating the web page by combining the source information with a pre-stored page template; transmitting the web page to the terminal and at least one or more other terminals in which the control channels are formed with the terminal; and performing a function corresponding to the control command and then transmitting process results to the terminal and the other terminals in which the control channels are formed with the terminal when a control command is received from any one terminal.

7 Claims, 5 Drawing Sheets

(58) Field of Classification Search
CPC ..... H04W 84/045; H04W 4/14; H04W 88/18;
H04W 76/02; H04W 4/16; H04W 12/06;
H04W 88/02
See application file for complete search history.

(56) References Cited

U.S. PATENT DOCUMENTS

| | | |
|---|---|---|
| 2003/0014483 A1 | 1/2003 | Stevenson et al. |
| 2007/0077913 A1 | 4/2007 | Kim |
| 2007/0118796 A1 | 5/2007 | Nazem et al. |
| 2008/0075067 A1* | 3/2008 | Guglielmi ........... H04W 76/023 370/352 |
| 2009/0172172 A1* | 7/2009 | Graham .................. E21B 10/52 709/227 |
| 2010/0192071 A1 | 7/2010 | Noguchi |
| 2012/0281595 A1* | 11/2012 | Long ..................... H04M 3/428 370/259 |
| 2013/0007290 A1* | 1/2013 | Yang .................. H04L 12/6418 709/227 |
| 2013/0169550 A1* | 7/2013 | Gai ........................ G06F 3/041 345/173 |
| 2015/0026257 A1* | 1/2015 | Balakrishnan ....... H04N 21/233 709/204 |

OTHER PUBLICATIONS

International Search Report for PCT/KR2013/006817 dated Nov. 12, 2013.

* cited by examiner

SCREEN SYNCHRONIZATION CONTROL SYSTEM, AND METHOD AND APPARATUS FOR SYNCHRONIZING A SCREEN USING SAME

CROSS-REFERENCE TO RELATED APPLICATION

This application claims priority to and the benefit of Korean Patent Application No. 10-2012-0101969 filed in the Korean Intellectual Property Office on Sep. 14, 2012, the entire contents of which are incorporated herein by reference.

TECHNICAL FIELD

The present invention relates to a method of controlling screen synchronization between a plurality of terminals, and more particularly, to a screen synchronization control system and a method and apparatus for synchronizing a screen using same, which is capable of generating a web page on the basis of source information when the source information is received from any one terminal in which a control channel is established, simultaneously transmitting the web page to other terminals in which the control channels are established with the terminal, and performing control such that an identical screen is displayed.

BACKGROUND

Various information sharing technologies are being developed due to an increase in requirement by users, who desire to share specific information with other users anywhere at any time, and rapid development of information communication technologies.

Transmission and reception of files between terminals may also be a technology developed based on the above-described requirement. For example, when information is intended to be shared through mobile communication terminals, a user of a first terminal enters a number of a second terminal and attaches and then transmits a file, and a user of the second terminal may easily check the file transmitted by the user of the first terminal by using the second terminal.

Furthermore, technologies for sharing information such as sharing a screen between a plurality of terminals are recently attracting much attention.

A technology for sharing a screen is a technology capable of sharing a variety of information that is included in the screen by capturing in real time a screen that is currently displayed on a specific terminal and transmitting the captured screen to another device that is connected to the terminal, which is mainly used in electronic conferencing, computer remote control, and the like and recently widely used due to advantages in that information can be checked in real time and shared easily.

However, in order to use such various information sharing technologies, a user should directly generate information that is intended to be shared, transmit the generated information to a terminal of another user, and previously store the information in a terminal of the user though the information is shared through a screen sharing technology.

In addition, in the information sharing technologies, any one controlling terminal controls other terminals, and thus the controlled terminals can just check only information that is provided, but cannot enter or transmit any other control command.

SUMMARY

The present invention is directed to providing a screen synchronization control system and a method and apparatus for synchronizing a screen using the same, which enables a service device to generate a web page automatically and provide the generated web page to a terminal connected through the control channel when a user provides only source information to a service device without generating information that is intended to be shared with a calling party.

The present invention is also directed to providing a screen synchronization control system and a method and apparatus for synchronizing a screen using the same, which enables terminals connected through a control channel, irrespective of a controlling terminal and a controlled terminal, to transmit a control command to a service device and receive a result of performing a function corresponding to the control command from the service device.

One aspect of the present invention provides a screen synchronization control system including: a terminal configured to establish a control channel with at least one other terminal, transmit source information for generating a web page to a service device, receive the web page from the service device, and display the received web page; and a service device configured to, when the source information is received from any one of the terminal and the at least one other terminal having the control channel established with the terminal, combine the source information with a previously stored page template to generate the web page and then transmit the generated web page to the terminal and the at least one other terminal, and when a control command is received from any one of the terminal and the at least one other terminal, perform a function corresponding to the control command to transmit a result of performing the function to the terminal and the at least one other terminal.

Another aspect of the present invention provides a service device including: a service communication unit configured to transmit and receive information to and from a plurality of terminals; and a service control unit configured to, when source information is received from a first terminal, combine the source information with a previously stored page template to generate a web page and then transmit the generated web page to the first terminal and at least one second terminal having a control channel established with the first terminal, and when a control command is received from any one of the first terminal and the at least one second terminal, perform a function corresponding to the control command to transmit a result of performing the function to the first terminal and the at least one second terminal.

When a control channel establishment request message for establishing the control channel with the at least one second terminal is received from the first terminal, the service control unit may perform user authentication on the first terminal, and when the user authentication is successful, the service control unit may allocate the control channel between the first terminal and the at least one second terminal.

When a control channel establishment request message including authentication information of the at least one second terminal is received from the first terminal, the service control unit may perform the user authentication by comparing the authentication information with previously stored authentication information of the at least one second terminal.

The service device may further include a service storage unit configured to store information on the previously stored page template for generating the web page, in which the service control unit performs control to assign address information to the source information received from the first terminal and the web page generated by combining the source information with the previously stored page template and then store the source information and the web page having the address information assigned thereto.

The source information may be any one of image data, video data, and text data.

Still another aspect of the present invention provides a screen synchronization method including: collecting, by a service device, source information for generating a web page from a first terminal; combining, by the service device, the source information with a previously stored page template to generate a web page; and transmitting, by the service device, the generated web page to the first terminal and at least one second terminal having a control channel established with the first terminal.

The screen synchronization method may further include, before collecting the source information for generating the web page from the first terminal: transmitting, by the first terminal, to the service device, a control channel establishment request message including authentication information of the at least one second terminal previously stored from the second terminal; and comparing the authentication information of the at least one second terminal included in the control channel establishment request message and the authentication information of the at least one second terminal previously stored in the at least one second terminal to allocate the control channel between the first terminal and the at least one second terminal when the authentication information is the same.

The screen synchronization method may further include, after transmitting the generated web page to the first terminal and the at least one second terminal: receiving, by the service device, a control command for the web page from any one of the first terminal and the at least one second terminal; performing, by the service device, a function corresponding to the control command; and transmitting, by the service device, a result of performing the function to the first terminal and the at least one second terminal having the control channel with the first terminal.

The receiving of the control command for the web page may include performing, by the service device, the function corresponding to the control command according to a previously set priority when the control command is simultaneously received from the first terminal and the at least one second terminal.

The previously set priority may be set to preferentially process the control command of the first terminal that has requested the control channel establishment Still yet another aspect of the present invention provides a computer-readable recording medium storing a program for executing the synchronization method.

According to a screen synchronization control system and a method and apparatus for synchronizing a screen using the same, when a user who desires to share information with a calling party through screen sharing provides only source information to a service device without directly generating information, the service device may generate a web page automatically to provide the generated web page to a terminal connected through a control channel.

Thus, a user, such as a salesman for terminals, an engineer for processing terminal failures, and the like may explain relevant information more easily by sharing a screen with a calling party terminal, and a user of the calling party terminal may also input a control command and check a result of processing the control command.

DETAILED DESCRIPTION

Figure 1:
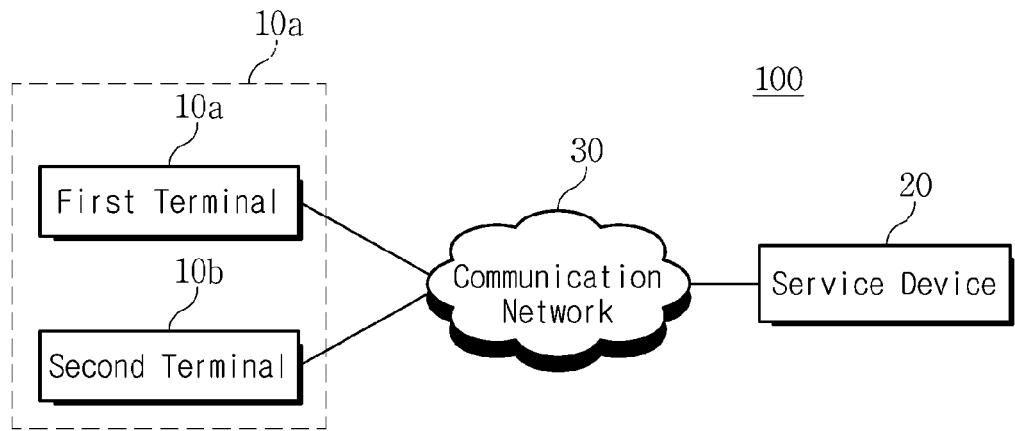
FIG. 1 is a schematic block diagram showing a message information protection system according to an embodiment of the present invention.

Hereinafter, preferred embodiments of the present invention will be described in detail with reference to the accompanying drawings such that a person skilled in the art may easily carry out the embodiments of the present invention. In the following description of an operation principle according to preferred embodiments of the present invention, when the detailed description of the relevant known function or configuration is determined to unnecessarily obscure subject matters of the present invention, the detailed description will be omitted. Therefore, the unnecessary redundant description is avoided for the purpose of obviously describing the subject matters of the present invention without unnecessary obscurity. While the terms "first," "second," etc. may be used herein to describe various elements, these terms are used only to differentiate one element from another, and not to limit the elements.

In addition, like reference numerals refer to like elements throughout the specification.

Moreover, a terminal according to an embodiment of the present invention may be implemented in a variety of forms. For example, a terminal that is described in this specification may be a stationary terminal such as a smart TV, a desktop computer, and the like as well as a mobile terminal such as a smart phone, a tablet PC, a personal digital assistant (PDA), a portable multimedia player (PMP), an MP3 player. In addition, the terminal may be also any terminal if the terminal may share information with another user over a communication network.

For convenience of description, in an embodiment of the present invention, a first terminal is a terminal of a user who desires to share specific information with another terminal, for example, a second terminal through screen synchronization, and a second terminal is a terminal of a user who may check information provided from the first terminal according to a request from the user of the first terminal. However, the present invention is not limited thereto, and functions and operations of the first terminal and the second terminal may be the same.

A screen synchronization control system according to an embodiment of the present invention will be described below.

FIG. 1 is a schematic block diagram showing a main configuration of a screen synchronization control system according to an embodiment of the present invention.

Referring to FIG. 1, a screen synchronization control system 100 according to an embodiment of the present invention may include a plurality of terminals 10, a service device 20 configured to provide a screen synchronization control service, and a communication network 30.

For more detailed description of elements of the screen synchronization control system 100, the plurality of terminals 10 are terminals of users who desire to share information through screen synchronization. Here, it is provided as an example that a first terminal 10a intends to display information currently displayed on the first terminal 10a through a screen of the second terminal 10b according to a request from the first terminal 10a.

In order to use a screen synchronization control service according to an embodiment of the present invention, any one of the plurality of terminals, for example, the first terminal 10a transmits a control channel establishment request message to the service device 20 configured to provide the screen synchronization control service. In this case, the first terminal 10a may transmit the control channel establishment request message to the service device 20 while connecting a call or communicating with a calling party terminal.

Here, preferably, the control channel establishment request message may include identification information of the first terminal 10a, identification information of a calling party terminal that is intended to be connected by the first terminal 10a, that is, the second terminal 10b, and authentication information of the second terminal 10b.

When the control channel establishment request message is received, the service device 20 first performs user authentication on the first terminal that has requested control channel establishment in order to allocate a control channel between the first terminal 10a and the second terminal 10b to which the first terminals 10a desires to connect.

Here, the user authentication of the first terminal 10a may be achieved by comparing authentication information of the second terminal 10b included in the control channel establishment request message.

More specifically, the first terminal 10a transmits a screen sharing request message to a terminal with which a screen is intended to be shared through screen synchronization, that is, the second terminal 10b before transmitting the control channel establishment request message to the service device 20.

When the screen sharing request message is received, the second terminal 10b may generate and transmit an acceptance message to the first terminal 10a when accepting the request of the first terminal 10a and may generate and transmit a rejection message to the first terminal 10a when not desiring screen sharing.

Here, when the second terminal 10b accepts the request of the first terminal 10a, the second terminal 10b generates authentication information in addition to the acceptance message and transmits the generated authentication information to the first terminal 10a and simultaneously to the service device 20.

As described above, the service device 20 performs user authentication on the first terminal 10a by comparing authentication information of the second terminal 10b that is included in the control channel establishment request message received from the first terminal 10a with authentication information of the second terminal 10b that is received from the second terminal 10b and previously stored.

In addition, the service device may further determine whether the first terminal 10a has subscribed to the screen synchronization service provided by the service device 20 on the basis of the authentication information of the first terminal 10a when the user authentication is performed. However, a detailed description of the configuration will be omitted.

If the user authentication of the first terminal 10a is successful, the service device 20 allocates a control channel to the first terminal 10a and the second terminal 10b to establish the control channel.

Here, a state in which the control channel is established means a state in which the service device 20 may synchronize and control information displayed on the first terminal 10a and another terminal connected with the first terminal 10a, that is, the second terminal 10b.

In this case, the service device 20 does not access all information stored in the respective terminals to synchronize and control the screen, but generates a web page on the basis of information received from the terminal, transmits the generated web page to each terminal, and controls only a synchronization process on the web page.

More detailed description thereof will be provided.

When information (hereinafter, referred to as source information) intended to be shared with the second terminal 10b is received from any one terminal, preferably, a terminal that has requested control channel establishment, that is, the first terminal 10a, the service device 20 generates one web page in combination with a page template that is previously stored in the source information. In this case, the first terminal 10a may transmit the source information to the service device 20 while connecting a call or communicating with a calling party terminal.

Here, the source information is information that is intended to be shared with the second terminal 10b by the first terminal 10a, which may be one or more of the following information: an image, a video, and a text.

Subsequently, the service device 20 transmits the generated web page to the first terminal 10a and the second terminal 10b. When a control command is received from any one of the first terminal 10a and the second terminal 10b, the service device 20 performs a function corresponding to the control command and then delivers a processing result obtained by performing the function to the first terminal 10a and the second terminal 10b at the same time. In this case, the service device 20 may transmit, to the first terminal 10a and the second terminal 10b, a web page that is generated while connecting a call between the first terminal 10a and the second terminal 10b or communicating between the first terminal 10a and the second terminal 10b.

Here, the control command may be a click event, a drag event, a scroll event, etc. The performing of the function corresponding to the control command may include performing various forms of control commands and functions that may operate on a web page, such as zoom in, zoom out, next page view, previous page view, screen movement, and the like.

As such, when a terminal of a user who desires to share specific information with another user terminal, for example, the first terminal 10a transmits source information to the service device 20, the service device 20 automatically generates a web page based on the source information to transmit the generated web page to terminals connected thereto. Thus, advantageously, the terminal of the user who desires to share information with another terminal may share and check the information more easily without separately generating sharing information.

In addition, advantageously, the terminal may share only information that is intended to be shared with the other terminal through screen synchronization under control of the service device 20, thus preventing unconditional access of the service device 20 or the calling party terminal and enforcing security when the screen is shared.

Furthermore, as described above, the first terminal 10a and the second terminal 10b may share specific information even while connecting a call or talking. Specifically, when the first terminal 10a transmits source information to the service device 20 while communicating with the second terminal 10b, the service device 20 may transmit the web page generated through the source information to the first terminal 10a and the second terminal 10b while communicating between the first terminal 10a and the second terminal 10b. In addition, when the first terminal 10a transmits the source information to the service device 20 while connecting a call between the first terminal 10a and the second terminal 10b, the service device 20 may transmit the web page generated through the source information to the first terminal 10a and the second terminal 10b while connecting a call between the first terminal 10a and the second terminal 10b or communicating between the first terminal 10a and the second terminal 10b.

An operating method of the terminals 10 and the service device 10 will be described below in more detail. The plurality of terminals 10 and the service device 20 transmit and receive a variety of related information over the communication network 30. The communication network 30 may include various forms of communication networks.

For example, the communication network 30 may include a wireless communication type, such as wireless LAN (WLAN), Wi-Fi, Wibro, Wimax, and high speed downlink packet access (HSDPA), and a wired communication type, such as Ethernet, xDSL (ADSL, VDSL), hybrid fiber coaxial cable (HFC), fiber to the curb (FTTC), and fiber to the home (FTTH).

In addition to the above communication types, the communication network 30 may also include other communication types that are widely known or will be developed in the future.

Preferably, in order to use a screen synchronization method according to an embodiment of the present invention, an application program that supports a screen synchronization control service provided by the service device 20 is stored in the terminals, that is, the first terminal 10a and the second terminal 10b. The application program may perform control such that the second terminal 10b automatically generates authentication information to transmit the generated authentication information to the first terminal 10a and the service device 20 when the second terminal 10b accepts a screen sharing request message from the first terminal 10a and may also provide a user interface used to transmit the source information of the first terminal 10a to the service device 20.

In addition, when transmitting and receiving information to and from the service device 20, the first terminal 10a and the second terminal 10b may transmit their own identification information to the service terminal 20. When the identification information is received, the service device 20 may determine whether each terminal has subscribed to a service provided by the service device 20 on the basis of the identification information.

Here, the identification information may be information (telephone number) on a mobile communication service to which the terminal 10 has subscribed, a mobile identification number (MIN), an electronic serial number (ESN). The service device 20 may store authentication information corresponding to the identification information of the terminal 10 or store and manage control channel information that is set corresponding to the identification information.

A main configuration and an operation method of the terminal 10 according to an embodiment of the present invention will be described below.

Figure 2:
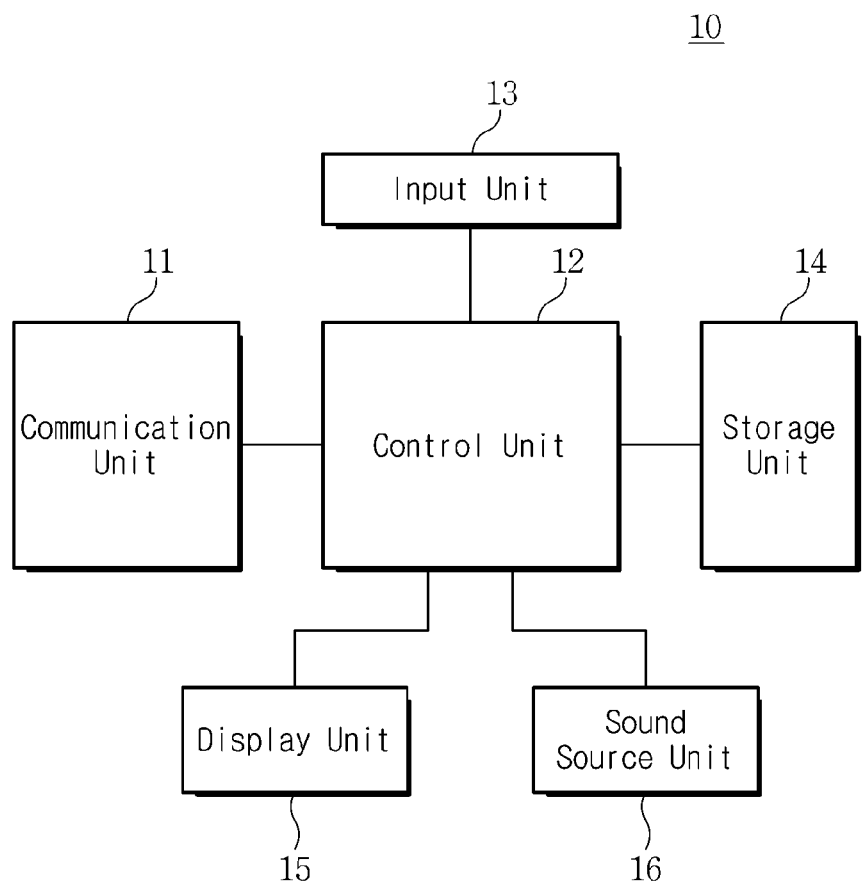
FIG. 2 is a block diagram showing a main configuration of a terminal of FIG. 1 according to an embodiment of the present invention.

FIG. 2 is a block diagram showing a main configuration of a terminal of FIG. 1 according to an embodiment of the present invention.

Referring to FIGS. 1 and 2, the terminal 10 according to an embodiment of the present invention may include a communication unit 11, a control unit 12, an input unit 13, a storage unit 14, a display unit 15, and a sound source output unit 16.

As described above, the terminal 10 is illustrated as a terminal of a user (for example, the first terminal 10a) that desires to share specific information with another terminal (for example, the second terminal 10b) through screen synchronization as shown in FIG. 1. However, the present invention is not limited thereto. The first terminal 10a and the second terminal 10b have the same functions and operations.

For more detailed description of respective elements, first, the communication unit 11 may transmit/receive information to/from another terminal or the service device 20 over the communication network 30, and in particular may serve to transmit a screen sharing request message to the other terminal with which information is intended to be shared through screen synchronization or transmit source information, such as, one or more images, videos, and texts, that is intended to be shared with the other terminal. The communication unit 11 may include various types of communication modules for transmitting and receiving information.

The control unit 12 is configured to control a flow of signals for supplying power to respective elements and allowing the elements to perform functions, and may include a processing device for driving the elements, for example, a central processing unit (CPU).

In particular, the control unit 12 according to an embodiment of the present invention first delivers a screen sharing request message to a calling party terminal, for example, the second terminal 10b, with which specific information is intended to be shared through screen synchronization according to a request from a user. When an acceptance message is received from the second terminal 10b, the control unit 12 generates and transmits a control channel establishment request message to the service device 20 through the communication unit 11. In this case, the control unit 12 may transmit the control channel establishment request message while connecting a call or communicating with the calling party terminal.

Preferably, the control channel establishment request message may include authentication information of the second terminal 10b that is previously received from the second terminal 10b, and the service device 20 performs user authentication on the basis of the authentication information, and allocates a control channel to respective terminals when the user authentication is successful.

Subsequently, the control unit 12 transmits the source information that is intended to be shared with the second terminal 10b to the service device 20. In this case, the control unit 12 may transmit the source information to the service device 20 while connecting a call or communicating with a calling party terminal (for example, the second terminal 10b).

Here, the source information may be one or more of images, videos, and texts. The control unit 12 may perform control such that a user interface that may transmit the source information to the service device 20 through the display unit 15 to be described later is displayed.

In this case, information on a page template provided by the service device 20 through the user interface may be output. A user may check the page template and then sequentially select and input source information, and the control unit 12 may transmit to the service device 20 the source information that is sequentially input.

For example, when the page template has an image on a top end and a text on a bottom, the user may first select an image corresponding to an image part of the page template and input a text corresponding to a text part of the page template. The control unit 12 may sequentially transmit the image and the text in addition to information on the page template.

In addition, the control unit 12 may allocate a serial number, for example, 10 to the image corresponding to the image part of the page template and allocate a serial number, for example, 20 to the text corresponding to the text part of the page template to transmit the serial numbers to the service device 20 together with the information on the page template.

The service device 20 checks a position in a page template on the basis of the source information or serial numbers that are sequentially received together with the information on the page template, and combines the source information with the page template to generate a web page.

In addition, the control unit 12 sets the source information or link information for the web page according to a request from the user.

For more detailed description, as described above, the control unit 12 may transmit source information that is input from the user in sequence or assign a serial number to the source information and then transmit the source information all at once.

Moreover, setting may be performed on the link information. For example, when a click event occurs on a first image, the link information may be set to play back a first video corresponding to the click event and then transmitted to the service device 20.

In addition, the control unit 12 may transmit the source information to the service device 20 and then receive a web page generated corresponding to the source information to perform control to display the web page on the display unit 15.

The input unit 13 receives a variety of information such as number and character information and delivers, to the control unit 12, a signal that is received in relation to setting of various functions and controlling of functions of the terminal 10. In particular, the input unit 13 according to an embodiment of the present invention supports a user input for transmitting a screen sharing request message to another terminal with which information is intended to be shared through screen synchronization, and receives the source information from the user or supports a user input for transmitting a screen sharing message to the service device 20.

The input unit 13 may include at least one of a keypad and a touchpad, which generate an input signal according to a touch or manipulation of a user. In this case, the input unit 13 may be configured as one touch panel (or touch screen) with the display unit 15 to be described later and perform an input function and also a display function. In addition, the input unit 13 may include one or more of a key input means such as a keyboard or keypad, a touch input means such as a touch sensor or touch pad, and a gesture input means or voice input means including one or more of a gyro sensor, a geomagnetic sensor, an acceleration sensor, a proximity sensor, and a camera. Furthermore, the input unit 13 may include all types of input means that are currently developed or will be developed in the future.

The storage unit 14 stores an application program necessary for functional operations according to an embodiment of the present invention and various data that is generated during execution of the application program. In particular, the storage unit 14 according to an embodiment of the present invention may store source information for generating a web page.

The storage unit 14 may largely include a program area and a data area. The program area may store related information for driving a terminal 10, such as an operating system (OS) that boots the terminal 10, and the data area is an area for storing data generated according to the use of the terminal 10 in which a message input by a user and a message received from a calling party may be stored.

The storage unit 14 may include a flash memory, a hard disk, a multimedia card micro type memory (for example, an SD or XD memory), a random access memory (RAM), and a read only memory (ROM).

The display unit 15 displays information on a series of operation states and operation results that are generated while the terminal 10 performs functions. For example, the display unit 15 may display a variety of information for screen sharing and display a web page received from the service device 20.

The display unit 15 may include a liquid crystal display (LCD), a thin film transistor LCD (TFT-LCD), an organic light emitting diodes (OLED), a light emitting diode (LED), an active matrix organic LED (AMOLED), a flexible display, and a three-dimensional display.

The sound source output unit 16 may convert a sound source that is an electrical signal into an analog signal and output a variety of information for screen sharing.

The main elements and the operation method of the terminal 10 according to an embodiment of the present invention have been described hereinbefore.

A main configuration and an operation method of the service device 20 according to an embodiment of the present invention will be described below.

Figure 3:
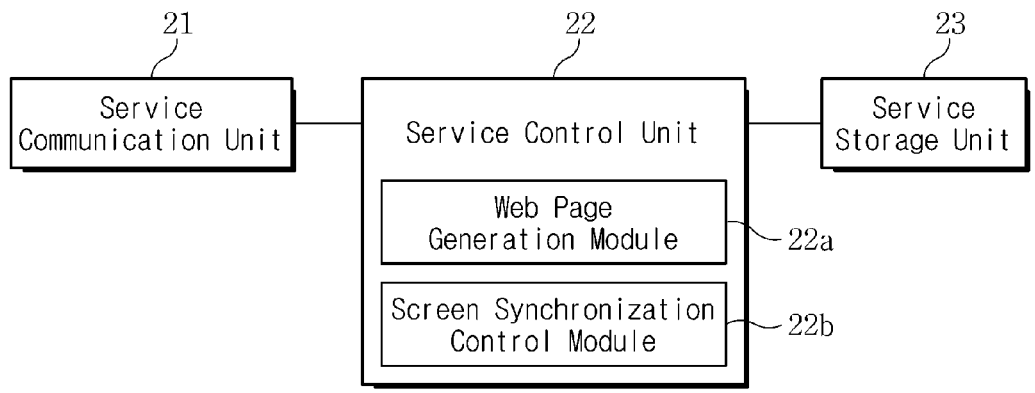
FIG. 3 is a block diagram showing a main configuration of a service device of FIG. 1 according to an embodiment of the present invention.

FIG. 3 is a block diagram showing a main configuration of a service device of FIG. 1 according to an embodiment of the present invention.

Referring to FIGS. 1 and 3, a message information protection service device 20 according to an embodiment of the present invention may include a service communication unit 21, a service control unit 22, and a service storage unit 23. In particular, the service control unit 22 may further include a web page generation module 22*a* and a screen synchronization control module 22*b*.

For more detailed description of respective elements, the service communication 21 transmits and receives information to and from a plurality of terminals 10 over the communication network 30. For example, the service communication unit 21 receives a control channel establishment request message or receives source information from the first terminal 10*a*, transmits a web page generated corresponding to the source information to another terminal with which the first terminal 10*a* has established a control channel, and receives a control command for the web page from the first terminal 10*a* and the second terminal 10*b*.

The service control unit 22 performs overall control of the service device 20 for screen synchronization control, and performs user authentication on the first terminal 10a when a control channel establishment request message for establishing a control channel with the second terminal 10b is received from any one terminal, for example, the first terminal 10a.

Here, the user authentication may be performed by comparing authentication information of the second terminal 10b that is included in the control channel establishment request message received from the first terminal 10a with authentication information of the second terminal 10b that is previously received from the second terminal 10b.

When the authentication information of the second terminal 10b is the same, and the first terminal 10a had obtained acceptance of a screen sharing request from the second terminal 10b, the service control unit 22 establishes respective control channels with the first terminal 10a and the second terminal 10b.

Subsequently, when source information that is intended to be shared with the second terminal 10b is received from the first terminal 10a, the service control unit 22 combines the source information with a previously stored page template to generate a web page.

To this end, preferably, the service control unit 22 first provides information on the page template to the first terminal 10a that has provided the source information, and combines source information sequentially received together with the page template information from the first terminal 10a that has checked the provided information or source information received together with a serial number from the first terminal 10a with the page template to generate the web page.

Here, the page template includes a basic background image for generating a web page, a font and a color, and basic position information of source information. The service control unit 22 stores and manages such information on the page template in the service storage unit 23 to be described later.

In addition, the service control unit 22 may assign address information to the source information and the web page that is generated by combining the source information with the previously stored page template when storing the source information and the web page in the service storage unit 23.

Here, the address information may be a uniform resource locator (URL), which indicates information on a link between a stored position in the service storage unit 23 and the source information or web page.

For example, it is assumed that, from the first terminal 10a, a first image and a first text are received from the first terminal 10a corresponding to first page template information, a first video is received corresponding to second page template information, and also link information on the first video is received corresponding to the first image. The service control unit 20 combines the first page template with the first image and the first text to generate a first web page, combines the second page template with the first video to generate a second web page, and then assigns address information to the generated web pages to store the web page in the service storage unit 23.

Here, in order to indicate an order between the first web page and the second web page, the address information may be assigned in the order of P001 and P002. When a click event on next page view occurs at the first web page corresponding to P001, the next page is P002. The service control unit 20 searches the service storage unit 23 for the second web page corresponding to P002 and then transmits the searched second web page to each terminal.

As such, the service device 20 transmits the web pages to which the address information is assigned to the first terminal 10a and the second terminal 10b. When a control command is received from any one of the first terminal 10a and the second terminal 10b, the service device 20 performs a function corresponding to the control command and then delivers a processing result obtained by performing the function to the first terminal 10a and the second terminal 10b. Thus, the first terminal 10a and the second terminal 10b may check the same screen independently at the same time under control of the service device 20.

If a control command is received from the first terminal 10a and the second terminal 10b at the same time, the service control unit 22 may process the control command according to a predetermined priority. Here, the predetermined priority may be set to preferentially process a control command of the first terminal 10a that has transmitted the control channel establishment request message. However, the present invention is not limited thereto, and thus the priority may be set in various ways.

In this case, the service control unit 22 may transmit a guide message "the control command of the first terminal 10a is processed first" to the second terminal 10b of which a control command is not processed.

As such, when a terminal of a user who desires to share specific information with another terminal just transmits source information to the service device 20 without directly generating information that is intended to be shared, the service device 20 may combine the source information with the previously stored page template to automatically generate and transmit one web page to terminals connected thereto and may perform control to display the same screen on the connected terminals at the same time according to a control command of any one terminal.

To this end, when the source information is received from any one terminal, the service control unit 22 may include a web page generation module 22a configured to combine the source information with the previously stored template to generate a web page and a screen synchronization control module 22b configured to establish a control channel between terminals, set a priority for a control command, and transmit a result obtained by processing a control command received from any one terminal to connected terminals.

In addition, the service storage unit 23 stores overall information for controlling screen synchronization. In particular, the service storage unit 23 according to an embodiment of the present invention may store authentication information received from the second terminal 10b corresponding to authentication information of the second terminal 10b and store various forms of templates for generating a web page.

In addition, the service storage unit 23 may temporarily or permanently store information that is transmitted and received between the first terminal 10a and the second terminal 10b in which the control channel is established and may temporarily or permanently store web pages that are transmitted to respective terminals.

The service device 20 for screen synchronization control service according to an embodiment of the present invention has been described hereinbefore.

The above-described service device 20 according to an embodiment of the present invention may be implemented as one or more servers that operate in a server-based computing type or a cloud computing scheme. In particular, any information transmitted and received through the screen synchronization control system 100 may be provided through a cloud computing function that may be permanently stored in a cloud computing device on the Internet. The cloud computing refers to technology for servicing information technology (IT) resources virtualized by utilizing Internet technology, such as hardware (e.g., a server, a storage, and a network), software (e.g., database, security, and web server), service, data and the like in an on demand scheme, as described above. In the present invention, all types of information transmitted and received between the plurality of terminals 10 and the service device 20 may be stored in a cloud computing device on the Internet and also transmitted anywhere at any time.

The main elements of the terminal 10 and the service device 20 have been described hereinbefore with reference to FIGS. 2 and 3. However, all of these elements described with reference to FIGS. 2 and 3 are not essential. The terminal or service device may be implemented by a number of elements more or less than the number of the elements shown in the drawings.

A screen synchronization method according to an embodiment of the present invention will be described below with reference to FIGS. 4 to 8.

Before the description of a screen synchronization method according to an embodiment of the present invention, it is preferable that any one terminal which desires to share information through screen synchronization should obtain acceptance of a screen sharing request from a calling party terminal.

This will be described below with reference to FIG. 4.

Figure 4:
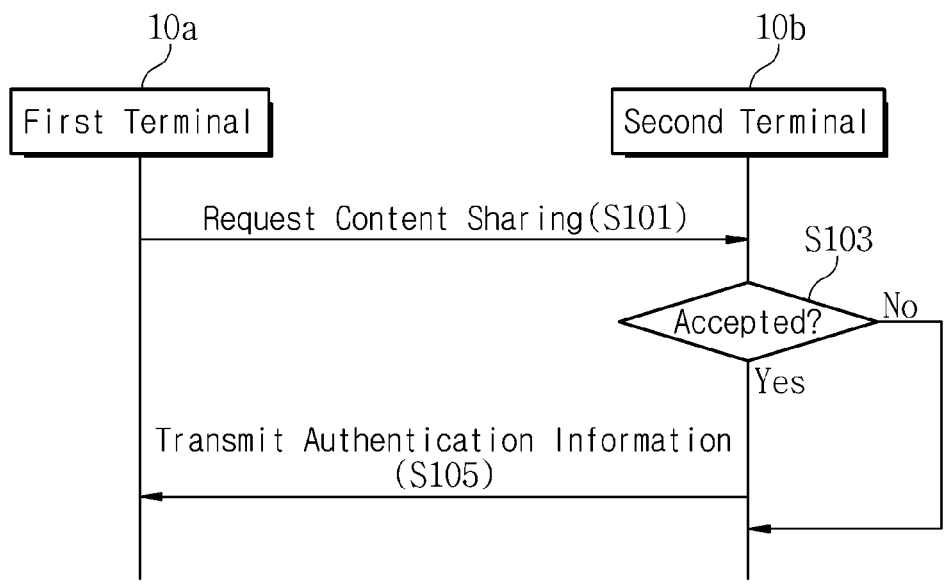
FIG. 4 is a schematic flowchart showing a method of generating authentication information between terminals according to an embodiment of the present invention.

FIG. 4 is a schematic flowchart showing a method of generating authentication information between terminals according to an embodiment of the present invention.

First, a first terminal 10*a* that desires to share a screen with a terminal 10*b* transmits a screen sharing request message to the second terminal 10*b*. Here, the screen sharing request message may be transmitted in the form of a message using a short message service (SMS), multimedia message service (MMS) or in the form of a popup in a screen synchronization control service application that is included in the first terminal 10*a* and the second terminal 10*b*.

When the screen sharing request message is received, the second terminal 10*b* transmits an acceptance message when accepting the request of the first terminal 10*a* in operation S103. In this case, the second terminal 10*b* also transmits authentication information to the first terminal 10*a*.

Here, the authentication information may be automatically and randomly generated by the screen synchronization control service application program. The service device 20 may perform user authentication for establishing a control channel on the basis of the generated authentication information.

In addition, when the second terminal 10*b* does not accept the request of the first terminal 10*a* in operation S103, the second terminal 10*b* may transmit a rejection message.

A screen synchronization method by the service device 20 according to an embodiment of the present invention will be described below.

Figure 5:
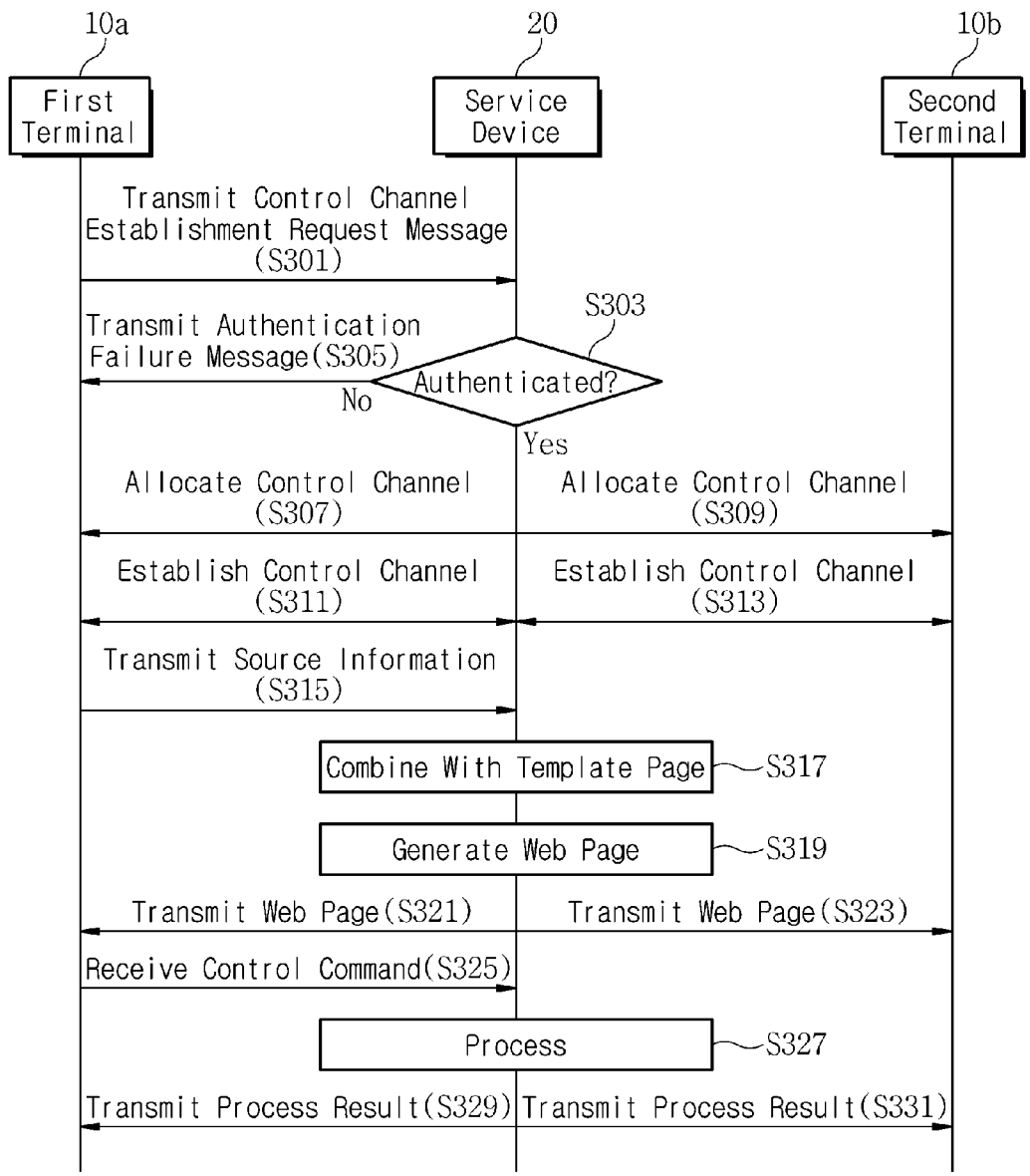
FIG. 5 is a data flowchart showing a method of synchronizing a screen at a service device according to an embodiment of the present invention.

FIG. 5 is a data flowchart showing a method of synchronizing a screen at a service device according to an embodiment of the present invention.

Referring to FIG. 5, the first terminal 10*a* and the service device 20 have received authentication information for screen sharing from the second terminal 10*b* as described above.

In this case, when the first terminal 10*a* transmits a control channel establishment request message for establishing a control channel with the second terminal 10*b* in operation S301, the service device 20 performs user authentication by determining whether the control channel establishment message of the first terminal 10*a* is appropriate in operation S303. In this case, the first terminal 10*a* may transmit the control channel establishment request message to the service device 20 while connecting a call or communicating with a calling party terminal (for example, the second terminal 10*b*).

Here, the user authentication may be performed by comparing authentication information of the second terminal 10*b* that is included in the control channel establishment request message received from the first terminal 10*a* with authentication information of the second terminal 10*b* that is previously received from the second terminal 10*b*.

As a result, when the user authentication fails, the service device 20 transmits an authentication failure message to the first terminal 10*a* in operation S305. In this case, when the authentication information included in the control channel establishment request message is different from the authentication information received from the second terminal 10*b*, the service device 20 may transmit an authentication failure message "Authentication information is different. Please obtain acceptance of the screen sharing request from the calling party terminal" to the first terminal 10*a*.

In addition, the service device 20 may delete the authentication information after a certain time elapses from when the authentication information is received from the second terminal 10*b*.

For example, when the first terminal 10*a* transmits a screen sharing request message to the second terminal 10*b* and the second terminal 10*b* generates an acceptance message, the first terminal 10*a* and the second terminal 10*b* should establish a control channel within a certain time, for example, five minutes, under control of the service device 20; otherwise, the authentication information is deleted in the service device 20, and the service device 20 may transmit an authentication failure message "Authentication allowable time has passed. Please obtain acceptance of the screen sharing request from the calling party terminal again" without accepting authentication of the first terminal 10*a* although the terminal 10*a* has transmitted the control channel establishment request message for establishing a control channel with second terminal 10*b* to the service device 20 after a certain time had elapsed.

If the authentication is successful in operation S303, the service device 20 allocates a control channel to the first terminal 10*a* and the second terminal 10*b* to establish the control channel in operations S307 to S313.

Subsequently, when source information that is intended to be shared with the second terminal 10*b* is received from the first terminal 10*a* in operation S315, the service device 20 combines the source information with a previously stored page template to generate a web page in operation S323. In this case, the first terminal 10*a* may transmit the source information to the service device 20 while connecting a call or communicating with a calling party terminal (for example, the second terminal 10*b*). In addition, the service device 20 may transmit, to the first terminal 10*a* and the second terminal 10*b*, a web page that is generated while connecting a call or communicating between the first terminal 10*a* and the second terminal 10*b*. Accordingly, when the first terminal 10*a* transmits source information to the service device 20 while communicating with the second terminal 10*b*, the service device 20 may transmit the web page generated through the source information to the first terminal 10*a* and the second terminal 10*b* while communicating between the first terminal 10a and the second terminal 10b. In addition, when the first terminal 10a transmits the source information to the service device 20 while connecting a call between the first terminal 10a and the second terminal 10b, the service device 20 may transmit the web page generated through the source information to the first terminal 10a and the second terminal 10b while connecting a call between the first terminal 10a and the second terminal 10b or communicating between the first terminal 10a and the second terminal 10b.

Here, the service device 20 may permanently or temporarily store and manage the source information received from the first terminal 10a and the generated web page. In this case, address information is assigned to the source information and the web page.

This will be described below with reference to FIGS. 6a and 6b.

Figure 6A:
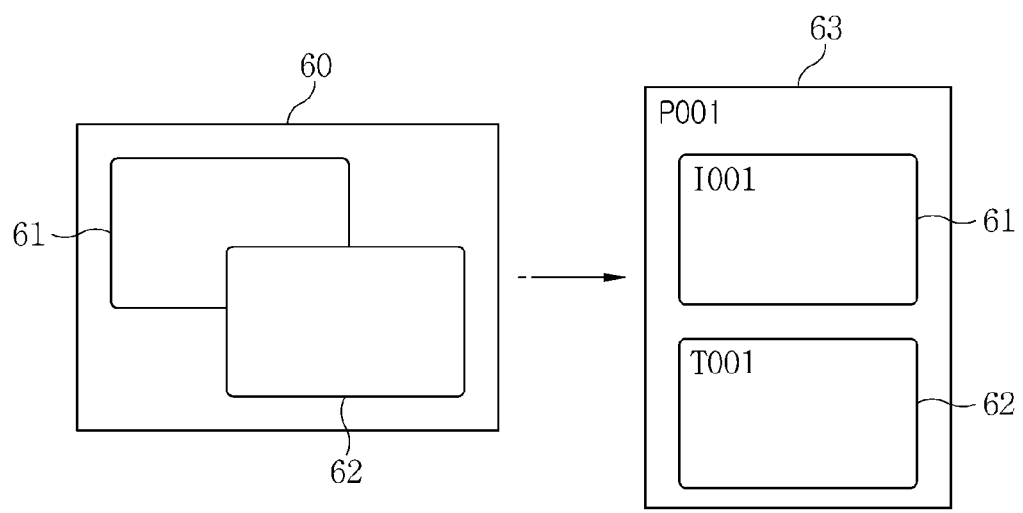
FIG. 6a and FIG. 6b are an exemplary diagram for describing a web page generation method according to an embodiment of the present invention.
Figure 6B:
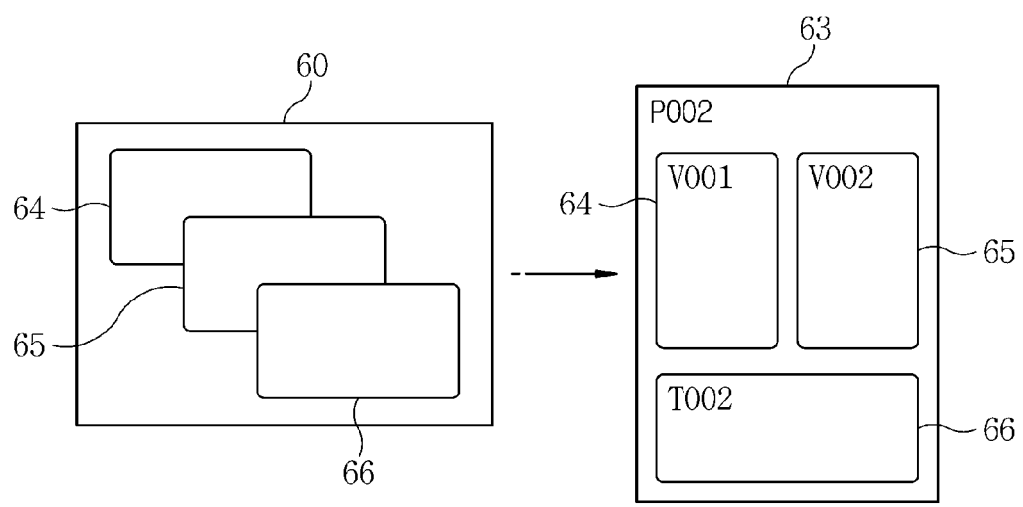

FIGS. 6a and 6b are an exemplary diagram for describing a web page generation method according to an embodiment of the present invention.

First, referring to FIG. 6a, when source information including a first image 61 and a first text 62 is received from the first terminal 10a corresponding to first page template information 60, the service device 20 combines a first page template corresponding to the first page template information 60 with the first image 61 and the first text 62 to generate a first web page 60a.

In this case, the service device 20 assigns the generated first web page 60a, the first image 61, and the first text 62 address information, that is, P001, I001, and T001, respectively, and then stores the generated first web page 60a, the first image 61, and the first text 62.

Subsequently, referring to FIG. 6b, when source information including a first video 64, a second video 65, and a second text 66 is received from the first terminal 10a corresponding to second page template information 69, the service device 20 combines a second page template corresponding to the second page template information 69 with the first video 64, the second video 65, and the second text 66 to generate a second web page 69b. When the generated second web page 69b is a web page positioned next to the first web page 60a, the service device 20 assigns and stores the address information as P002, and then assigns the first video 64, the second video 65, and the second text 66 respective pieces of address information and stores the first video 64, the second video 65, and the second text 66.

Here, if the web page corresponding to the control command for next page view of the first web page 60a is a third web page, the service device 20 may assign the first web page 60a the address information as P001-P003.

The address information is merely one example for convenience of description, and more specifically, may be generated in the form of a URL, such as "http://sktelecom.com/01011111234&where=P001&next&P003," including information on a position and a directory of the service device 20 in which the web page or the source information is permanently or temporarily stored.

When the web page is generated through the above-described process, the service device 20 transmits the generated web page to each terminal connected thereto through the control channel in operations 321 and 323. When a control command is received from any one terminal, for example, the first terminal 10a in operation S325, the service device 20 performs a function corresponding to the control command in operation S327 and transmits a result page about a processing result obtained by performing the function to respective terminals connected through the control channel, that is, the first terminal 10a and the second terminal 10b.

Figure 7:
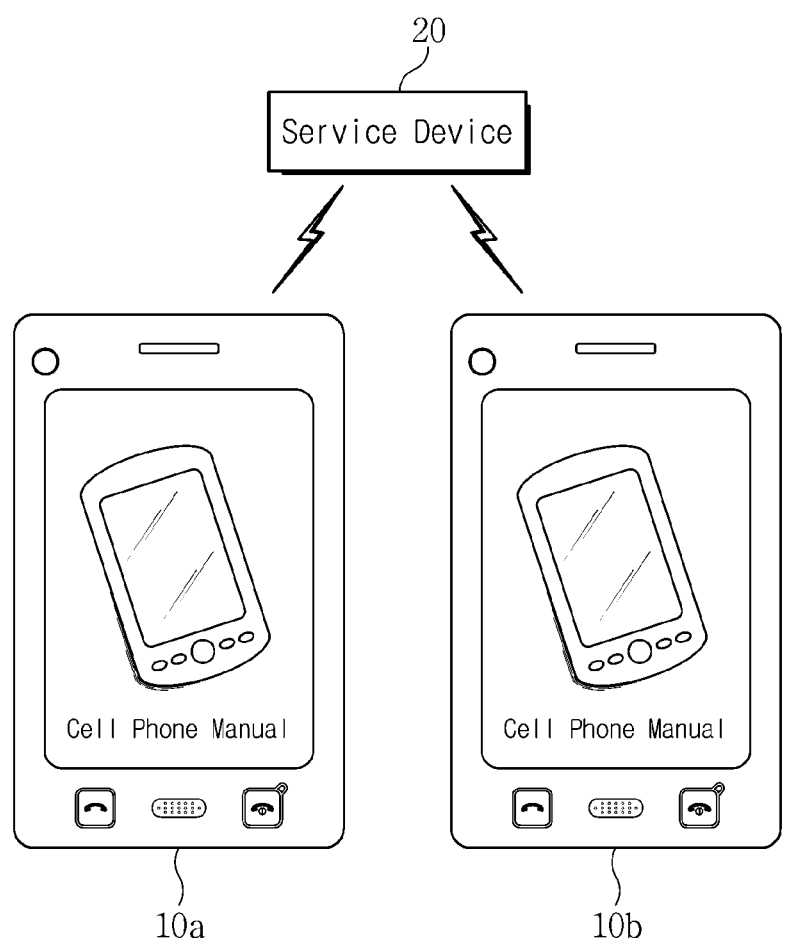
FIG. 7 is an exemplary diagram of a screen illustrating a method of synchronizing a screen between terminals according to an embodiment of the present invention.

In other words, as shown in FIG. 7, the first terminal 10a and the second terminal 10b may check the same screen under control of the service device 20. When a terminal that desires to share the screen provides information such as a video, an image, and a text to the service device 20, the service device 20 automatically generates a web page. Advantageously, the terminal may more easily share information through screen sharing by receiving and checking the generated web page.

In addition, a user, such as a salesman for terminals, an engineer for processing terminal failures, and the like may explain relevant information more easily by sharing a screen with a calling party terminal, and a user of the calling party terminal may also input a control command and check a result of processing the control command.

In addition, when a presenter in an electronic conference transmits to the service terminal 20 only information on terminals of users who have attended the electronic conference and source information that is intended to be presented in the electronic conference, the service device 20 combines the source information with a previously stored page template suitable for a conference format to generate a web page and then transmits the generated web page and a screen for a result of processing a control command of the presenter to the terminals of the users who will attend the electronic conference. Thus the presenter may proceed with the conference more easily.

The screen synchronization control system according to an embodiment of the present invention has been described.

A processor equipped in the terminal 10 and the service device 20 according to an embodiment of the present invention may process a program command for executing the method according to an embodiment of the present invention. In one implementation, the processor may be a single-threaded processor. In alternative implementations, the processor may be a multithreaded processor. Furthermore, the processor may also process a command stored in a memory or a storage device.

The computer program (known as programs, software, software applications, scripts, or codes) mounted on the apparatus according to the present invention and executing the method according to the present invention may be written in any form of program languages including a compiled language, an interpreted language, a transcendental language, or a procedural language, and may be developed in any form by including an independent program or a module, component, subroutine, or any other unit suitable for use in a computer environment. The computer program does not necessarily correspond to a file of a file system. The program may be stored in a single file provided to a requested program, in interoperating multiple files (for example, files each storing some of one or more modules, lower level programs, or codes) or in a part of a file containing other programs or data (for example, one or more scripts stored in a markup language document). The computer program may be located at a single site or over a plurality of sites in a distributed fashion and developed so as to be executed on multiple computers connected to one another through a communication network or on a single computer.

Examples of a computer readable medium suitable for storing the computer program instruction and data include a semiconductor memory device including an erasable programmable read-only memory (EPROM), an electrically erasable programmable read-only memory (EEPROM), and a flash memory device, and all non-volatile memories, media, and memory devices including a magnetic disk, such as an internal hard disk or an external disk, a magneto-optical disk, and CD-ROMs and DVD-ROMs. A processor and a memory may be supplemented by a specific purpose logic circuit or integrated into a specific purpose logic circuit.

The specification includes details of a number of specific implements, but it should be understood that the details do not limit the present invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all of the operations be executed. In some cases, a multitasking and a parallel processing may be beneficial. In addition, it should not be understood that the separation of various system components in the above described embodiments is required in all embodiments, and it should be understood that the above described program components and systems may be incorporated into a single software product or may be packaged in multiple software products.

Hereinbefore, embodiments of the subject matter in the specification, that is, a message information protection method, have been described. Other embodiments are within the scope of the following claims. For example, the operations recited in the claims can be performed in a different order and still achieve desirable results. As an example, operations depicted in the drawings in a particular order should not be understood as requiring that such operations be performed in the particular order shown or in sequential order. In a certain embodiment, a multitasking and a parallel processing may be beneficial.

The description suggests the best mode of the present invention to provide an example that explains the present invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the claims.

INDUSTRIAL APPLICABILITY

The present invention relates to a method for controlling screen synchronization between a plurality of terminals and, more particularly, to a screen synchronization control system and a method and apparatus for synchronizing a screen using same, which is capable of generating a web page on the basis of source information when the source information is received from any one terminal in which a control channel is established, simultaneously transmitting the web page to other terminals in which the control channels are established with the terminal, and performing control such that an identical screen is displayed.

According to a screen synchronization control system and a method and apparatus for synchronizing a screen using the same of the present invention, when a user who desires to share information with a calling party through screen sharing provides only source information to a service device without directly generating information, the service device may generate a web page automatically to provide the generated web page to a terminal connected through a control channel. Accordingly, a user, such as a salesman for terminals, an engineer for processing terminal failures, and the like may explain relevant information more easily by sharing a screen with a calling party terminal, and a user of the calling party terminal who listens to the explanation may also input a control command and check a result of processing the control command, thus facilitating sales of terminals or processing failures associated with the terminal of the user more easily. In addition, general users may easily share information with a calling party through screen synchronization.

Moreover, the present invention has industrial applicability in that it is obvious to have sufficient possibility of marketability and also actually be carried out.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A service device, comprising:
a service communication unit configured to communicate with a plurality of terminals comprising a first terminal and second terminal;
a service storage unit configured to store information on a page template for generating a web page; and
a service control unit configured to,
when a control channel establishment request message including authentication information of the second terminal is received from the first terminal, perform user authentication by comparing the authentication information included in the received control channel establishment request message with previously stored authentication information of the second terminal,
when the user authentication is successful, allocate a control channel between the first terminal and the second terminal,
when source information is received from the first terminal, generate the web page by combining the received source information with the stored information on the page template,
transmit the generated web page to the first terminal and the second terminal having the control channel established with the first terminal, and
when a control command associated with the generated web page is received from one of the first terminal and the second terminal, perform a function corresponding to the received control command and then transmit a result of performing the function associated with the generated web page to the first terminal and the second terminal, wherein the source information is information that is intended to be shared with the second terminal by the first terminal, wherein the service control unit is configured to
assign address information to the received source information and the generated web page, and
store the received source information and the generated web page with the assigned address information, and wherein the service device controls a synchronization process on the generated web page.

2. The service device of claim 1, wherein the source information comprises one of image data, video data, and text data.

3. The service device of claim 1, wherein when the first terminal is communicated with the second terminal having the control channel established with the first terminal, the service control unit is configured to collect the source information from the first terminal.

4. A screen synchronization method, performing by a service device, the screen synchronization method comprising:

receiving, from a first terminal, a control channel establishment request message including authentication information of a second terminal;

comparing the authentication information included in the received control channel establishment request message with previously stored authentication information of the second terminal, allocating a control channel between the first terminal and the second terminal when the authentication information of the second terminal included in the received control channel establishment request message is determined to be equal to the previously stored authentication information of the second terminal, collecting source information for generating a web page from a first terminal;

generating the web page by combining the collected source information with a previously stored page template;

assigning address information to the received information and the generated web page;

storing the received source information and the generated web page with the assigned address information;

transmitting the generated web page to the first terminal and the second terminal having the control channel established with the first terminal;

receiving a control command associated with the generated web page from one of the first terminal and the second terminal;

performing a function corresponding to the received control command; and transmitting a result of performing the function associated with the generated web page to the first terminal and the second terminal having the control channel established with the first terminal, wherein the source information is information that is intended to be shared with the second terminal by the first terminal, wherein the page template includes one of a basic background image, a font, a color and basic position information of source information, wherein the address information indicates information on a link between a stored position in the service storage unit and the source information or the web page, and wherein the service device controls a synchronization process on the generated web page.

5. The screen synchronization method of claim 4, wherein the performing the function comprises:

when a plurality of control commands is simultaneously received from the first terminal and the second terminal, performing functions corresponding to the received plurality of control commands according to a previously set priority.

6. The screen synchronization method of claim 5, wherein the previously set priority is set to preferentially process a control command of the first terminal according to the allocated control channel requested by the first terminal.

7. The screen synchronization method of claim 4, wherein the collecting the source information comprises:

when the first terminal is communicated with the second terminal having the control channel established with the first terminal, collecting the source information from the first terminal.

* * * * *

UNITED STATES PATENT AND TRADEMARK OFFICE
CERTIFICATE OF CORRECTION

PATENT NO. : 9,858,032 B2
APPLICATION NO. : 14/567407
DATED : January 2, 2018
INVENTOR(S) : Jonghyun Kim Page 1 of 1

It is certified that error appears in the above-identified patent and that said Letters Patent is hereby corrected as shown below:

On the Title Page

Item (71) "Applicant" should read:
SK TECHX CO., LTD., Seoul (KR)

And:
Item (73) "Assignee" should read:
SK TECHX CO., LTD., Seoul (KR)

Signed and Sealed this
Thirtieth Day of October, 2018

Andrei Iancu
*Director of the United States Patent and Trademark Office*